United States Patent [19]

Blanz

[11] Patent Number: 5,871,217
[45] Date of Patent: Feb. 16, 1999

[54] LEVELLING VALVE FOR AUTOMATICALLY KEEPING CONSTANT THE VEHICLE HEIGHT OF A COMMERCIAL VEHICLE WITH AIR SUSPENSION

[75] Inventor: Roland Blanz, Heiligkreuzsteinach, Germany

[73] Assignee: Grau GmbH, Germany

[21] Appl. No.: 802,751

[22] Filed: Feb. 20, 1997

[30] Foreign Application Priority Data

Feb. 29, 1996 [DE] Germany ................. 196 07 619.6

[51] Int. Cl.⁶ .................................................. B60G 17/056
[52] U.S. Cl. ......................... 280/6.159; 280/124.16; 267/64.16; 137/625.68; 251/63.5
[58] Field of Search ...................... 280/714, 6.1, 711, 280/6.159, 6.157, 124.16; 267/64.16, 64.19; 137/625.66, 625.67, 625.68; 251/63.5, 63.4

[56] References Cited

U.S. PATENT DOCUMENTS 3,006,657  10/1961  Augustin .................................. 280/714

FOREIGN PATENT DOCUMENTS

| 2125217 | 9/1972 | France . | |
|---|---|---|---|
| 1144125 | 2/1963 | Germany . | |
| 2318535 | 10/1974 | Germany . | |
| 26 01 665 | 7/1977 | Germany ................. | 280/714 |
| 3716436A1 | 12/1988 | Germany . | |
| 04238712 | 8/1992 | Japan . | |
| 04238713 | 8/1992 | Japan . | |

*Primary Examiner*—Peter C. English
*Attorney, Agent, or Firm*—Womble Carlyle Sandridge & Rice

[57] ABSTRACT

A levelling valve is provided for automatically keeping constant the vehicle height of a commercial vehicle with air suspension. The levelling valve comprises a spring loaded double valve body (17), an inlet seat (18), a hollow control rod (20) having an outlet seat (19) for the double valve body (17) and movable toward sealed engagement with the double valve body (17), an actuation drive (6) having a guiding member (27) and an eccentric follower (10) responsive to the change in vehicle height for moving the control rod (20) towards or away from sealing engagement with the double valve body (17). A first vehicle height according to a closing position may be controlled by the actuation drive (6). A control piston (28) is located in a control chamber (31) in alignment with the axis (3) of the control rod (20) and is provided for the attainment for setting of a second vehicle height. The control chamber (31) is located in the guiding member (27) of the actuation drive (6). The control piston (28) is slidingly and sealingly arranged in the guiding member (27) so that the eccentric follower (10) is not loaded by a force acting on the control piston (28) during the adjusted second vehicle height. The control rod (20) is supported on the control piston (28).

12 Claims, 6 Drawing Sheets

LEVELLING VALVE FOR AUTOMATICALLY KEEPING CONSTANT THE VEHICLE HEIGHT OF A COMMERCIAL VEHICLE WITH AIR SUSPENSION

FIELD OF THE INVENTION

The invention is directed to a levelling valve used to automatically keep the height of a motor vehicle constant during loading and unloading of the vehicle. Such a levelling valve may be used on a commercial vehicle without a control valve to arbitrarily lift or lower the chassis of the vehicle, in combination with the suspension bellows of the vehicle. The levelling valve may be used also on a vehicle having a suspension bellows, in which the vehicle height can be varied by a control valve for operating the leveling valve to arbitrarily lift or lower the chassis of the vehicle in a way so that in the "lift" position the levelling valve is not active, and the suspension bellows operated by the levelling valve is connected to a source of compressed air in parallel to the levelling valve.

BACKGROUND OF THE INVENTION

A levelling valve of the type described above is known from German Patent Application No. DE 37 16 436 Al, the levelling valve having a height limitation. A control rod acting upon a double valve body of the inlet valve and the outlet valve is connected with a guiding member arranged slidingly and sealingly in a housing. The guiding member comprises a groove cooperating with an eccentric follower of an actuation drive. The actuation drive comprises a lever, a shaft rotatably arranged, and the eccentric follower. For height limitation purposes a hollow actuation rod is connected with the guiding member on the side opposed to the double valve body. The hollow actuation rod carries a vent seat to which an annular valve body is assigned, the valve body being spring loaded and suspended in the housing. The valve body cooperates with an inlet seat located in fixed relation there to in the housing so that in this way a closing valve is generated for a conduit leading to the bellows. Thus, the maximun suspension height of the vehicle is defined and limited. There is an assignment to the angle position of the lever of the actuation drive caused by the closing position, i.e. the position in which both the inlet valve and the outlet valve are closed at the same time. In general, a horizontal position of the lever of the actuation drive is assigned to the mentioned closing position in accordance with a first vehicle height. This means that the chassis of the vehicle during driving takes a first determined height in which the lever of the actuation drive is in a horizontal position and the closing position is reached on the inlet valve and the outlet valve so that the suspension bellows are neither aerated nor vented, but carry the chassis in the designed height. However, often it is useful to be able to attain a second vehicle height differing from the first vehicle height. This may be the case in order to adapt an inclined position of semitrailer to points on tractors having different heights. Another possibility of a second vehicle height is useful for busses. In such a second vehicle height the chassis of the bus may be lowered to make the entering of the bus easy for persons. In a third application it may be useful to have the chassis lowered to generate reduced drag. A levelling valve is known from FIG. 4 of DE 37 16 436 Al having the possibility to adjust alternatively to two different vehicle heights. For these purposes the groove in the guiding member into which the eccentric follower extends is provided with a large clearance so that the eccentric follower contacts the groove once on the one side of the groove or on the other side of the groove respectively. By this clearance the two different vehicle heights are defined. A control piston is connected in fixed manner with the guiding member and with the actuation rod extending downwardly in order to adjust alternatively to one of the two different vehicle heights. An aeratable control chamber is assigned to the control piston, the control chamber being positioned in the housing of the levelling valve. The aerated position of the control chamber is assigned to the second vehicle height, while the first vehicle height is reached by springs loading the control rod in case the control chamber is vented. It is a disadvantage that the control piston during aeration of the control chamber loads the guiding member and thus the control drive. Especially the eccentric follower extending into the groove of the guiding member is subjected to substantial wear reducing lifetime of the levelling valve. A further disadvantage is the different acting of the height limitation with respect to the first or the second adjusted vehicle height. If the second vehicle height is located above the first vehicle height the maximal stroke up to the stops for the chassis via the bellows must be assigned to the second vehicle height. However in this case the height limitation during adjustment of the first vehicle height is active i.e. the maximum stroke of the bellows cannot be used in the position of the first vehicle height.

German Patent No. DE 23 18 535 describes a levelling valve of a different type, in which the shaft of the actuation drive is extended and further elements are provided in parallel to the control rod for the inlet valve and the outlet valve, for example a second outlet valve having an enlarged cross section. Levelling valve of this kind may be provided with a height limitation also. On the other hand the adjustment of a second vehicle height is possible. The alternative adjustment of two different vehicle heights is described as a variation of a starting point or position. This variation of the starting position is performed in a similar manner as illustrated in FIG. 4 of DE 37 16 436 by the fact of providing a large clearance between the eccentric follower and the groove in the guiding member, which is bridged in the alternative adjustment of the two different vehicle heights.

SUMMARY OF THE INVENTION

It is an object of the invention to provide a levelling valve of the type mentioned above which is able to adjust alternatively to two different vehicle heights, and to reduce substantially the wear in the actuation drive, especially on the eccentric follower, inorder to lengthen lifetime of the levelling valve.

According to the invention this object is realized with a levelling valve of the type described above, in which a control chamber is located in a guiding member of the actuation drive, with a control piston slidingly and sealingly arranged in the guiding member so that the eccentric follower is not loaded by a force acting on the control piston during the adjusted second vehicle height, and in which the control rod is supported on the control piston.

The control chamber is no longer positioned in the housing of the levelling valve but in a member which is moved in conjunction with the control rod or is moved via the actuation drive respectively. It is especially useful to locate the control chamber in the guiding member or in a part connectable or connected with the guiding member. This means that the control piston is located in caged manner in the guiding member or in a part connectable or connected with the guiding member in order to load the guiding member with the existing force acting on the control piston during aeration of the control chamber. Thus, the existing force is not transmitted to the eccentric follower of the actuation drive. According to the invention the control rod functionally gets two different lengths, the first length of which is assigned to a first vehicle height and the second length is assigned to a second vehicle height. In the connection of the actuation drive and the guiding member no variation takes place, i.e. the eccentric follower is supported in the groove of the guiding member in the same way independent from the fact whether the first or the second vehicle height is adjusted. The load acting on the eccentric follower is comparatively small with respect to the arrangement of springs so that the wear of the actuation drive, especially of the eccentric follower, is substantially reduced and thus the lifetime of the levelling valve is lengthened to an acceptable time. The invention may be applied in both cases in which the second vehicle height is arranged lower or higher than the first vehicle height. Depending on the naming of which position is called the first vehicle height and which is called the second vehicle height, at least the running direction of the control piston is changed during aeration of the control chamber with respect to the inlet valve and the outlet valve of the levelling valve. The invention may be carried out in simple embodiments also. Thus, the provided guiding member may be used to locate the control chamber. The control rod may be designed as one or more parts. The control rod may extend through the guiding member partly or totally or even form a common unit with the control piston. The invention may be also applied in conjunction with a height limitation.

In a preferred embodiment of the invention the guiding member of the actuation drive is extended into a direction opposed to the inlet seat and formed as a sleeve. The control piston is positioned in the sleeve. The arrangement of the control chamber and the control piston in a sleeve connected with the guiding member on the side opposed to the inlet seat is useful. But it is possible also to locate the control chamber and the control piston in the vicinity of the control rod, without loading the eccentric follower by the existing force of the aerated control piston. While the control rod has a comparatively small diameter, the sleeve connected with the guiding member may have an enlarged diameter so that the needed surface of the control piston may be designed easier. This is possible also in spite of the arrangement of an actuation rod for a height limitation. The sleeve and the guiding member may be made from one piece also. However, for mounting purposes it is preferred to have two parts to be connected with each other.

The sleeve may comprise a cover defining the stroke of the control piston in the sleeve. In conjunction with the arrangement of a cover on the sleeve the possible stroke of the caged control piston may be defined and limited. The first end position is assigned to the first vehicle height. The second end position is assigned to the second vehicle height. It is evident to have a possibility to aerate the control chamber in the sleeve with air under pressure. But there are no difficulties to design this. The positioning of sealing rings on the outer diameter of the sleeve sliding in the housing is possible without problems.

If the cover is adjustably positioned in the sleeve by a thread, and thus the stroke of the control piston for the alternative adjustment of the two vehicle heights may be adjusted, a universal levelling valve is created having the possibility to adjust to the second vehicle height with respect to the first vehicle height. Thus, the levelling valve may be adjusted to respond to different applications. Thus this gives the possibility to adjust the difference between the two vehicle heights to an amount of 5 or 10 cm for example.

An adjustment screw may be provided between the control piston and the control rod for the adjustment of the closing position of the two vehicle heights. Looking from the side of the double valve body forming part of the inlet valve and the outlet valve there is only one common closing position in which both the inlet valve and the outlet valve are closed. The two alternatively adjustable vehicle heights have no influence on this. Two functionally different lengths of the control rod representing the two different vehicle heights are assigned to the common closing position. The actuation drive and especially the lever thereof takes different angle positions depending on the first and second vehicle heights.

The control piston and the control rod may form a common unit, and especially may be made from one piece. The adjustment of the closing position, i.e. the assignment of the closing position to a certain angle position of the lever of the actuation drive, in this case must be performed in a different way.

The novel levelling valve of this invention may be equipped with a height limitation also. For this purpose a hollow actuation rod connected with the guiding member is provided in order to realize the height limitation, the hollow actuation rod having a vent seat, to which a ring-like spring loaded valve body surrounding the actuation rod is assigned. These elements are known per se, but are used in a new fashion in which the control rod functionally has two different lengths and without substantial clearance between the eccentric follower and the guiding member. The surprising advantage of this is that the efficiency of the height limitation is the same in both of the adjusted vehicle heights so that the maximal possible stroke of the suspension bellows up to the stops may be used independently of the adjusted vehicle height. It is essential in this conjunction that the hollow actuation rod controlling the height limitation is connected with the guiding member but not with the control piston.

To avoid a hysteresis in the height limitation a spring loaded double valve body is positioned in the housing forming on the one hand, with an inlet seat fixed in the housing, a closing valve for a conduit leading to the suspension bellows; and on the other hand with the valve body a pilot valve. This gives the possibility after passing the height limitation and a venting of the conduit leading to the bellows to use a comparatively small ring-like surface between the exhaust seat and a further seat between the double valve body and the valve body in order to unload the inlet valve between the inlet seat and the double valve body during the leaving of the height limitation device to open the inlet valve.

The axial position of the vent seat and thus the common height limitation may be adjustably arranged via a thread with respect to the said actuation rod. A thread is located between the hollow actuation rod and the vent seat so that the position of the vent seat with respect to the inlet valve is adjustable. Thus, the angle of the lever of the actuation drive is adjusted. If this angle position is going to be surpassed the height limitation becomes active.

A threaded connection may be provided between the guiding member and the sleeve, and the actuation rod with the cover is connected with the sleeve in fixed relation as far as rotational movement is concerned. Since the guiding member is hindered to rotate by the eccentric follower of the actuation drive this gives the possibility to assign the single closing position to the two different angle positions of the lever of the actuation drive. For example, one of these angle positions may be a horizontally arranged position of the lever with respect to a vertically arranged axis of the housing of the levelling valve.

BRIEF DESCRIPTION OF THE DRAWINGS

The invention is further explained and described in preferred examples of realization, in which it is shown in.

DETAILED DESCRIPTION

Figure 1:
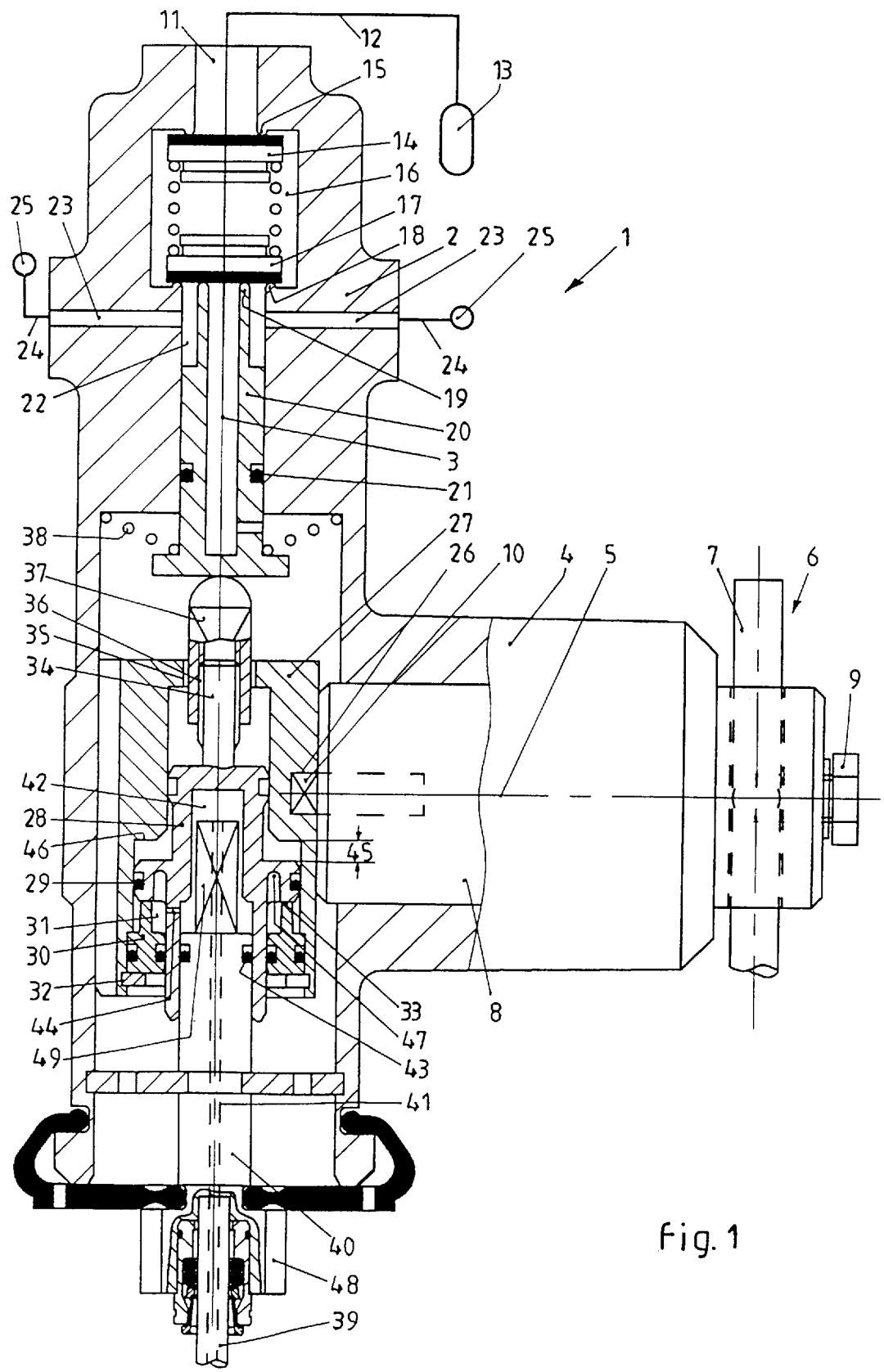
FIG. 1 a cross-sectioned elevational view of a first preferred embodiment of the levelling valve for two adjustable vehicle heights, FIG. 2 a cross-sectioned elevational view of a second levelling valve similar to the embodiment of FIG. 1, having a second vehicle height positioned below a first vehicle height, FIG. 3 a third embodiment of the levelling valve having an adjustable difference between the two vehicle heights, FIG. 4 a fourth levelling valve with height limitation and adjustable closing position, FIG. 5 a detail of the levelling valve of FIG. 4 showing a control valve for height limitation, and FIG. 6 a cross-sectioned view through a levelling valve having height limitation as shown in FIG. 4, but having a quick release valve also.

The levelling valve 1 illustrated in FIG. 1 comprises a housing 2 having an axis 3, to which important elements of the levelling valve 1 are positioned. The housing 2 has an extension 4, the axis 5 of which is arranged perpendicular to the axis 3 and which serves for the arrangement of important elements of an actuation drive 6. The actuation drive 6 comprises a lever 7 (only a part of which is shown), which is inserted with its one end portion into a radial bore of an axle 8 and which is fixed by a fixing screw 9. The other end portion of lever 7 (not shown) is connected with the axle of the vehicle, while the housing 2 having its axis 3 normally vertically arranged is connected with the chassis of the vehicle. But the inverse arrangement is possible also. An eccentric follower 10 being eccentrically located in the front surface of the axle 8 is also part of the actuation drive 6.

A connection 11 for a conduit 12 is arranged on the housing 2. The conduit 12 comes from a chemically illustrated air reservoir 13 for air under pressure. A valve body 14 and an annular rim 15 of the housing form an overflow valve 14, 15 so that air under pressure is present in a storage chamber 16 in the housing 2. A double valve body 17 is positioned in the storage chamber 16 and forms an inlet valve 17, 18 with an inlet seat 18 in the housing 2. An outlet seat 19 of a control rod 20 is in cooperation with the double valve body 17 so that an outlet valve 17, 19 is arranged here. The levelling valve 1 is shown in the closing position, i.e. the inlet valve 17, 18 is closed and the outlet valve 17, 19 is closed also.

The movable control rod 20 is sealed by the seal 21 and slidingly positioned in the housing 2 of the levelling valve 1. The seal 21 seals also an inlet chamber 22 being arranged around the control rod 20 and situated between the double valve body 17 and the seal 21. Conduits 24 are connected via radial channels 23 to the inlet chamber 22 and lead to schematically illustrate of suspension bellows 25 being arranged for example on the left and the right sides of the vehicle.

The actuation drive 6 with its eccentric follower 10 extends into a slit-like groove 26 of a guiding member 27, which is slidingly positioned in the direction of the axis 3 of the housing 2 so that during a pivotal movement of the actuation drive 6 about the axis 5 the rotational movement of the eccentric follower 10 is converted into a linear movement of the guiding member 27 in the direction of the axis 3 of the housing 2.

A control piston 28 is slidingly arranged in the guiding member 27 defining a longitudinally extending interior chamber and comprises a seal 29. The guiding member 27 is provided with a cover 30 having two seals, one seal sealing a control chamber 31 between the cover 30 and the guiding member 27 and the other sealing between the cover 30 and a projection of the control piston 28. The cover 30 is fixed in the guiding member 27 via a locking ring 32 and forms a first stop 33 for the movement of the control piston 28 limiting the stroke of the control piston 28 with respect to the guiding member 27 at one end. The control piston 28 is in the position shown in FIG. 1 if the control chamber 31 is vented. This position of the control piston 28 belongs to a first adjusted vehicle height. The control piston 28 has a threaded shaft 34 extending through an opening 35 of the guiding member 27. An adjusting screw 37 is in threaded connection 36 with the shaft 34. The adjusting screw 37 has a head being in contact with the control rod 20. The control rod 20 is designed hollow for exhaust purposes and is biased by a weak spring 38 in downward direction so that the control piston 28 is in contact with the stop 33 of the cover 30 also. Turning the adjusting screw 37, which may be part of the control rod 20 also, varies the effective length of the control rod 20 and makes it possible to adjust a desired angle position of the lever 7 of the actuation drive 6 with respect to the closing position, in which both the inlet valve 17, 18 and the outlet valve 17, 19 are closed. The adjustment by the adjusting screw 37 may be carried out in a manner so that a horizontal position of the lever 7 with respect to a vertically arranged housing 2 of the levelling valve 1 is allocated to the position shown in FIG. 1 representing a first adjusted vehicle height.

The control chamber 31 in the guiding member 27 must be aerated in order to attain a second vehicle height. A conduit 39 is connected with an insert 40 having an axial channel 41 and ending in a chamber 42 within the control piston 28. A seal 43 between the insert 40 and the control piston 28 seals the chamber 42 to the atmosphere. The chamber 42 is connected with the control chamber 31 via a bore 44.

Aeration of the control chamber 31 means to move the control piston 28 with respect to the guiding member 27 in a stroke 45 ending at a stop 46 of the guiding member 27. This aeration of the control chamber 31 and the surface 47 of the control piston 28 directed upwardly with air under pressure varies the effective length of the control rod 20 in order to move into the second vehicle height. A force is acting on the surface 47 of the control piston 28 via the stop 46 to the guiding member 27. But this force is taken directly by the guiding member 27 and thus not transmitted to the eccentric follower 10. The eccentric follower 10 is not loaded by this force, i.e. the wear in the groove 26 of the guiding member 27 is reduced substantially. only the weak force of the spring 38 is acting on the eccentric follower 10 so that the wear at the eccentric follower 10 is limited within acceptable limits.

Adjusting the second vehicle height by aeration of the control chamber 31 will cause a movement in opposed directions. While the actuation drive rests in the position according to the first vehicle height the control rod 20 is moved upwardly so that the inlet valve 17, 18 is opened via the closed outlet valve 17, 19. Thus air under pressure from the storage chamber 16 enters the suspension bellows 25 and the chassis of the vehicle is lifted with respect to the vehicle axis. This lifting varies the angle position of the lever 7 of the actuation drive 6 in a direction, which would demand the opening of the outlet valve 17, 19. But the outlet valve 17, 19 remains closed and only the opening of the inlet valve 17, 18 is reduced up to a point, in which the inlet valve 17, 18 closes again and thus the closing position is reached. This closing position is the same position of the double valve body 17 with respect to the inlet seat 18 and to the outlet seat 19 as in the first adjusted vehicle height but now assigned to the second vehicle height. It is useful to speak about a single closing position despite the existance of two differently adjusted vehicle heights. It is evident that the angle position of the lever 7 of the actuation drive 6 in the second vehicle height is different from the angle position in the first vehicle height due to the variation of the effective length of the control rod 20.

The insert 40 can be rotated via a polygonal driver 48 from the outside in order to rotate the adjusting screw 37 in the housing 2 of the levelling valve 1. The upper end of the insert 40 is provided with a further polygonal drive 49 cooperating with a polygonal countersurface of the control piston 28 so that rotation of the control piston 28 in the guiding member 27 is causes by the rotation of the insert 40 from the outside. The guiding member 27 is prevented from rotation about the axis 3 due to the eccentric follower 10 extending into the groove 26 of the guiding member 27. A polygonal opening 35 of the guiding member 27 and a cooperating polygonal surface of the adjusting screw 37 hinder the rotation of the adjusting screw 37. Thus, it is possible to adjust the threaded connection 36 from the outside by rotation of the polygonal driver 48 in order to vary the effective length of the control rod 20. This variation or adjustment respectively serves for the assignment of the two angle positions of the lever 7 with respect to the common closing position.

Figure 2:
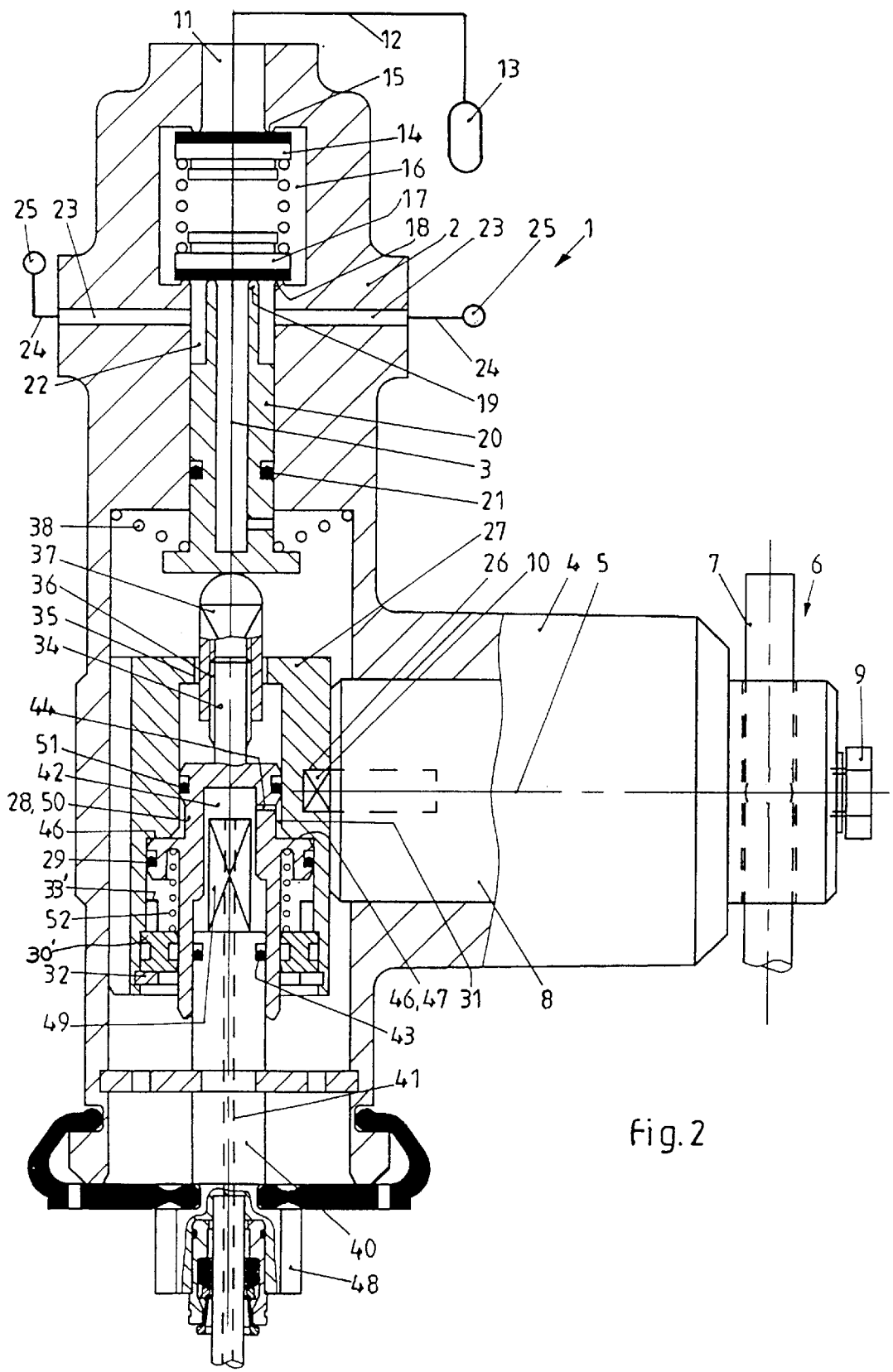

FIG. 2 illustrates a second embodiment of the levelling valve, which is similar to the embodiment of FIG. 1 in many respects so that it is not necessary to describe it again. The only difference is the fact that the control chamber 31 is located at a different place and the surface 47 acts downwardly so that the second vehicle height is positioned below the first vehicle height, while in the embodiment of FIG. 1 the second vehicle height is positioned above the first vehicle height. In both embodiments control piston 28 may also be designed as a stepped piston 50. To design the control chamber 31 a further seal 51 is inserted into a circular groove, while in the embodiment of FIG. 1 this seal is omitted. In the embodiment of FIG. 2 the two seals of the cover 30' are not needed. The bore 44 of the control piston 28 is located at a different place so that it communicates with the control chamber 31 between the two seals 29 and 51. A spring 52 is positioned between the cover 30' and the control piston 28, the spring 52 being stronger than the spring 38 so that the control piston 28 in the state of a vented control chamber 31, i.e. in the position of the first vehicle height, is brased into contact with the stop 46 of the guiding member 27. Aeration of the control chamber 31 means to move the control piston 28 downwardly so that it contacts stops 33' of ribs of the cover 30'. Thus, functionally the length of the control rod is reduced and the second vehicle height is adjusted, which is positioned below the first vehicle height, so that the chassis is lowered.

Figure 3:
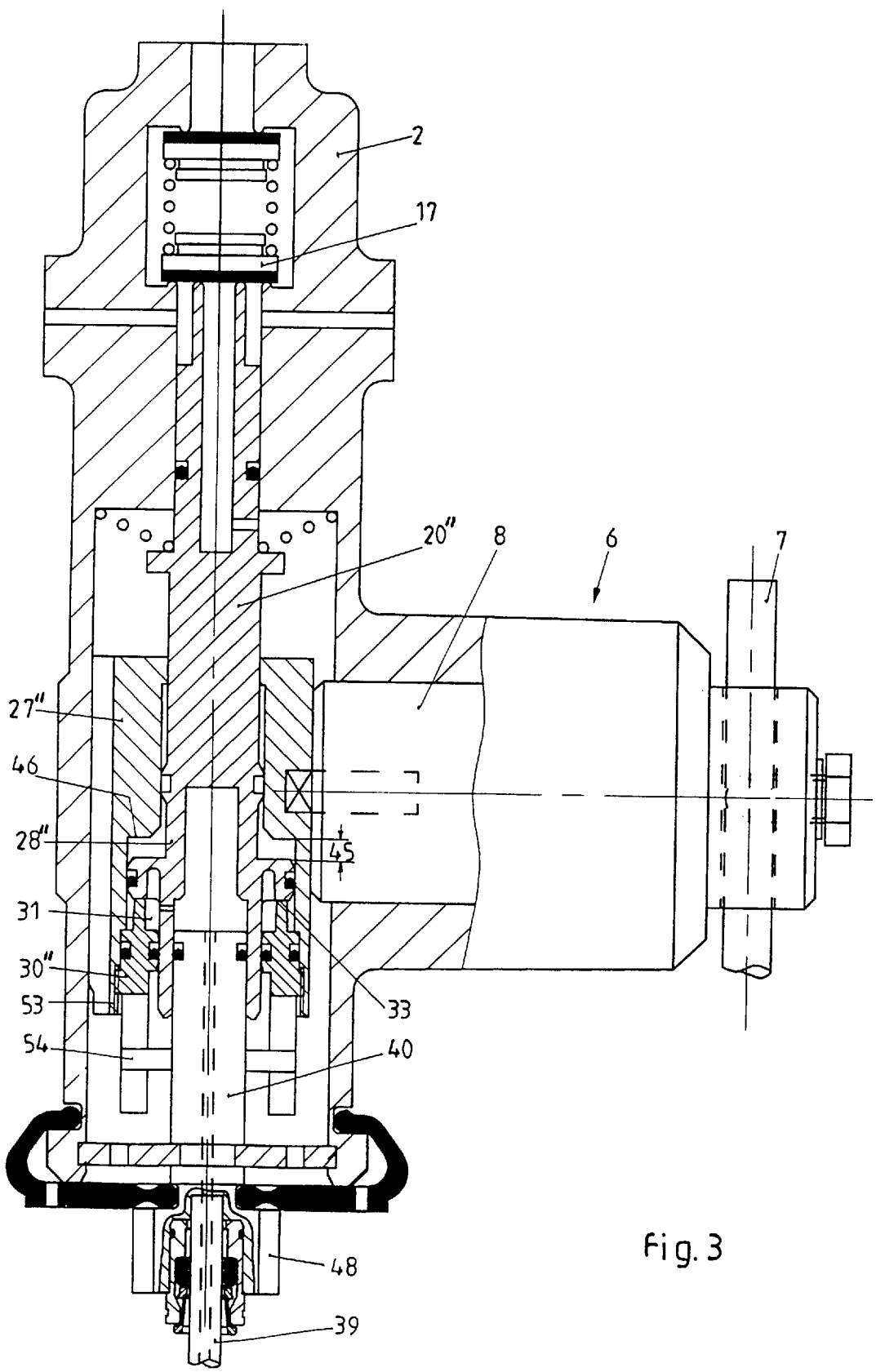

FIG. 3 illustrates yet another embodiment of the levelling valve. Control rod 20" and control piston 28" are designed from one piece. Thus, the control rod 20" extends through the guiding member 27". The cover 30" is not fixed on the guiding member 27" by a locking ring 32, but may be rotated in a thread 53 with respect to the guiding member 27". Rotation of the polygonal driver 48 of the insert 40 is transmitted to the cover 30" with respect to the guiding member 27". A connection comprising a forked lever 54 connects the insert 40 with the cover 30" in rotational respect. Thus, the desired stroke 45 between the stops 33 and 46 may be adjusted, which is proportional to the difference between the two vehicle heights. In other words, the second vehicle height may be adjusted with respect to the first vehicle height.

Figure 4:
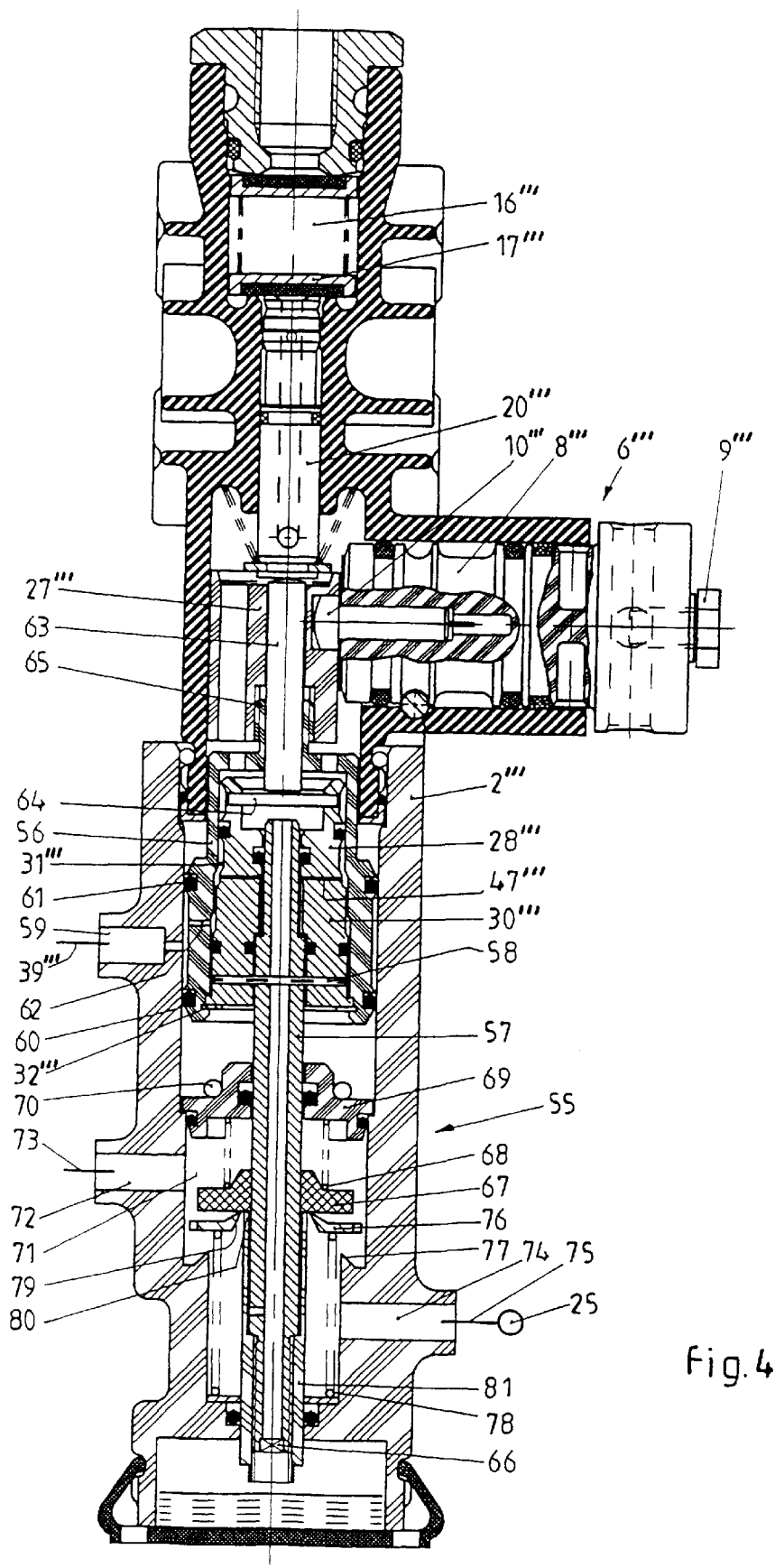

FIG. 4 illustrates another embodiment of levelling valve 1 in a sectioned view through the levelling valve 1 including an actuation drive 6''', an axle 8''', a fixing screw 9''', a storage chamber 16''', a double valve body 17''' and having a height limitation 55. The guiding member 27''' is extended by a sleeve 56 and increased in radial direction to locate the control piston 28'''. The cover 30''' having a polygonal cross section is fixed in the sleeve 56 via a locking ring 32''' and thus can be rotated only in a common manner together with the sleeve 56. The acting surface 47''' of the control piston 28''' is directed upwardly as in the embodiment of FIG. 1. An actuation rod 57, being hollow for venting purposes serves to control the height limitation 55. The actuation rod 57 is suspended on the cover 30''', but not on the control piston 28'''. A pin 58 serves for this. The conduit 39''' serving for the aeration of the control chamber 31''' is fixed on a connection 59 located on the side of the housing 2'''. The sleeve 56 has two seals 60 and 61 to aerate the control chamber 31''' via a bore 62 in the sleeve 56 in spite of the axial movement of the sleeve 56 and the guiding member 27'''. The control rod 20 is divided into two parts, wherein one rod member 63 extends through the guiding member 27''', the lower end of which contacts the control piston 28''' via a pin 64. But it is possible also to manufacture the control rod 20''' and the rod member 63 from one piece. Even the guiding member 27 and the sleeve 56 could be made from one piece. But as to be seen from FIG. 4 a threaded connection 65 is provided between the guiding member 27 and the sleeve 56 representing a similar adjustment possibility as the threaded connection 36 of the embodiments of FIGS. 1 and 2. Here also the adjustment of the closing position with respect to the two vehicle heights is possible. This adjustment is performed via the threaded connection 65 by rotation of the hollow actuation rod 57 over the polygonal driver 66, while the guiding member 27''' here also is prevented from rotation by the eccentric follower 10'''.

Figure 5:
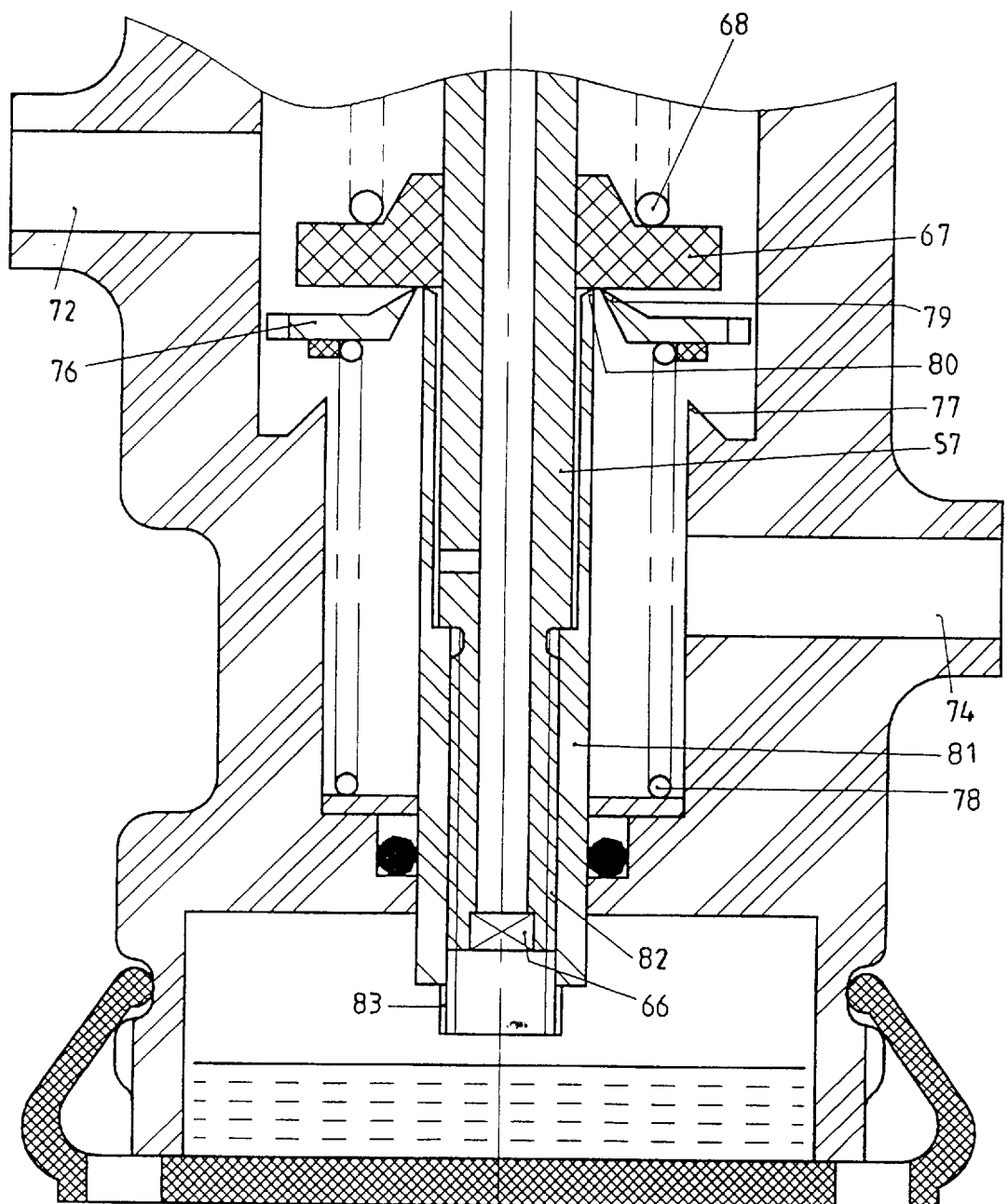

FIG. 5 once again illustrates the essential parts of the height limitation 55 of FIG. 4 in enlarged scale. A valve body 67 is supported on a spring 68 and surrounds the hollow actuation rod 57. The spring 68 is placed on a support 69, (FIG. 4) which is fixed by pins 70 traversing the housing 2 perpendicular to the axis 3. The support 69 is provided with sealings in the direction of the hollow actuation rod 57 and in the direction of the housing 2. Thus, a chamber 71 is generated having connection with a connection 72 communicating with a conduit 73. The conduit 73 comes from a control valve to arbitrarily lift or lower the chassis of the vehicle, especially during loading or unloading in the vicinity of a ramp, as it is described in the U.S. Pat. No. DE 37 16 436 Al. A connection 74 leads from the housing 2 via a conduit 75 to the suspension bellows 25. Part of the height limitation 55 is a double valve body 76 forming a closure valve 76, 77 with a fixed inlet seat 77 in the connection of conduits 73 and 75 normally open. The double valve body 76 is suspended on a spring 78 in the housing 2. The spring 78 is designed weaker than the spring 68. The double valve body 76 is provided with a relief seat 79 positioned on the side facing the valve body 67. The diameter of the relief seat 79 is designed slightly greater than the vent seat 80 of a sleeve-like extension 81. The sleeve-like extension 81 may be adjusted in axial direction via a thread 82 with respect to the hollow actuation rod 57. The extension 81 is provided with polygonal drive 83 for rotation purposes in the thread 82. It is evident that by preventing the polygonal drive 66 from rotation and rotating the polygonal driver 83 the axial length of the extension 81 can be varied and thus the vent seat 80 can be adjusted and adapted.

It is important to understand that the height limitation 55 is acting in both adjusted vehicle heights in the same manner. In other words, the maximal designed stroke in the suspension bellows 25 up to provided stops on the vehicle axes is used in the same manner. If for example the chassis of the vehicle by the use of a control valve is arbitrarily lifted or lowered starting from one of the two vehicle heights, air under pressure aerates via the conduit 73 (FIG. 4) into the chamber 71 and over the opened closure valve 76, 77 and the conduit 75 to the suspension bellows 25 causing the lifting of the chassis. A pivoting of the lever 7 of the actuation drive 6 results in the sense of opening the outlet valve 17, 19. But this opening cannot cause the venting of the bellows, because this is prevented by the control valve for arbitrarily lifting or lowering. Nevertheless the hollow actuation rod 57 is moved downwardly by the downward movement of the control rod 20 up to a point the double valve body 76 contacts the inlet seat 77 and thus closes the closure valve 76, 77. This means that a further aeration of the bellows 25 is impossible, because the conduit 73 leading to the bellows is closed. If a further pivotal movement of the lever 7 in the same direction occurs, for example caused by unloading of the chassis, then the outlet valve 67, 80 between the valve body 67 and the vent seat 80 opens and thus conduit 75 and the bellows 25 are vented in an extent up to a point, in which the outlet valve 67, 80 closes again. This occurs at maximal lifted chassis. A further lowering of the chassis in the direction of a previously adjusted vehicle height is caused by a venting of the conduit 73 via the control valve for arbitrarily lifting or lowering. Chamber 71 is vented in steps. The valve body 67 is released on its surface between the relief seat 79 and the vent seat 80 so that the relief seat 79 slightly leaves the valve body 67 communicating the chamber 71 with the conduit 75. A substantial hysteresis is prevented.

Figure 6:
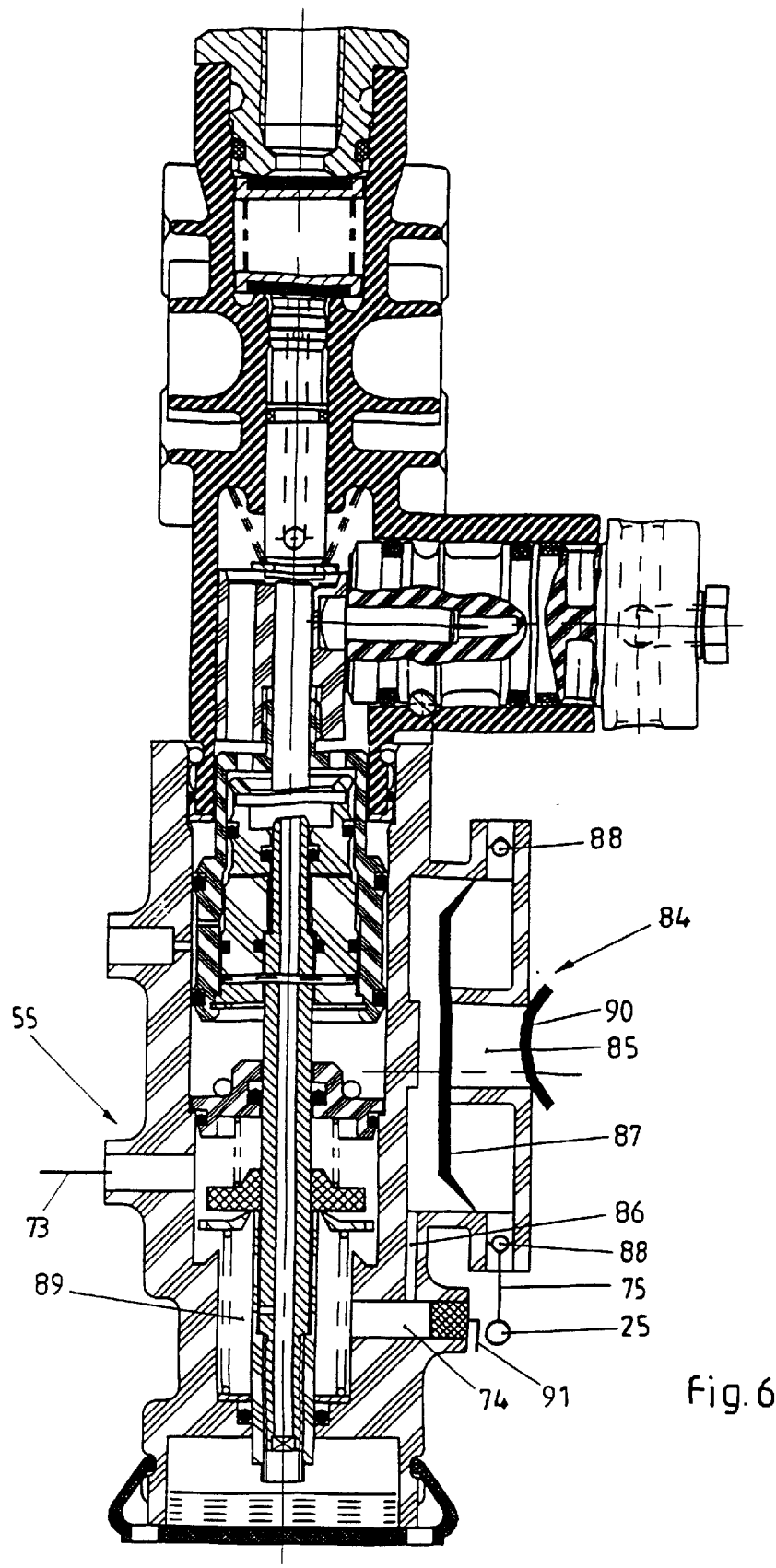

The embodiment of the levelling valve 1 of FIG. 6 is similar to the embodiment of FIG. 4. Here also a height limitation 55 is provided. However, a quick release valve 84 is arranged in the conduit 75 leading to the suspension bellows 25. The conduit 73 is connected to an air reservoir. The connection 74 comprising the conduit 91 leads to the control valve for arbitrarily lifting or lowering the chassis. A bore 86 leads to a membrane 87 of the quick release valve 84. The quick release valve 84 has an own exhaust vent 85, over which the bellows 25 may be vented rapidly via check valves 88, if the chamber 89 below the double valve body 76 is vented. The exhaust vent 85 is protected from dirt by a flap valve 90. While preferred embodiments of the invention have been disclosed in the foregoing Specification, it is understood by those skilled in the art that variations and modifications thereof can be made without departing from the spirit and scope of the invention, as set forth in the following Claims. Moreover, the corresponding structures, materials, acts, and equivalents of all means or step plus function elements in the claims are intended to include any structure, material, or acts for performing the functions in combination with other claimed elements, as specifically claimed herein.

LIST OF REFERENCE NUMERALS

| | | | |
|---|---|---|---|
| 1 | levelling valve | 11 | connection |
| 2 | housing | 12 | conduit |
| 3 | axis | 13 | air reservoir |
| 4 | extension | 14 | valve body |
| 5 | axis | 15 | rim |
| 6 | actuation drive | 16 | storage chamber |
| 7 | lever | 17 | double valve body |
| 8 | axle | 18 | inlet seat |
| 9 | fixing screw | 19 | outlet seat |
| 10 | eccentric follower | 20 | control rod |
| 21 | seal | 31 | control chamber |
| 22 | inlet chamber | 32 | locking ring |
| 23 | channel | 33 | stop |
| 24 | conduit | 34 | shaft |
| 25 | suspension bellow | 35 | opening |
| 26 | groove | 36 | threaded connection |
| 27 | guiding member | 37 | adjusting screw |
| 28 | control piston | 38 | spring |
| 29 | seal | 39 | conduit |
| 30 | cover | 40 | insert |
| 41 | channel | 51 | seal |
| 42 | chamber | 52 | spring |
| 43 | seal | 53 | thread |
| 44 | bore | 54 | forked lever |
| 45 | stroke | 55 | height limitation |
| 46 | stop | 56 | sleeve |
| 47 | surface | 57 | actuation rod |
| 48 | polygonal driver | 58 | pin |
| 49 | polygonal driver | 59 | connection |
| 50 | stepped piston | 60 | seal |
| 61 | seal | 71 | chamber |
| 62 | bore | 72 | connection |
| 63 | rod member | 73 | conduit |
| 64 | pin | 74 | connection |
| 65 | threaded connection | 75 | conduit |
| 66 | polygonal driver | 76 | double valve body |
| 67 | valve body | 77 | inlet seat |
| 68 | spring | 78 | spring |
| 69 | support | 79 | relief seat |
| 70 | pin | 80 | vent seat |
| 81 | extension | 91 | conduit |
| 82 | thread | | |
| 83 | polygonal driver | | |
| 84 | quick release valve | | |
| 85 | exhaustuant | | |
| 86 | bore | | |
| 87 | membrane | | |
| 88 | check valve | | |
| 89 | chamber | | |
| 90 | flap valve | | |

I claim:

1. A pneumatic leveling valve assembly usable with a pneumatic suspension system of a motor vehicle to maintain the motor vehicle at a predetermined vehicle height relative to a surface on which the motor vehicle is supported said leveling valve assembly comprising:

a housing having a longitudinal axis;

a compressed air storage chamber defmed in said housing;

an inlet valve seat formed in said housing and being in communication with said compressed air storage chamber;

a spring biased double valve body positioned within said compressed air storage chamber and being yieldably spring biased into sealing engagement with said inlet valve seat;

an elongated and substantially hollow control rod in said housing extending along said longitudinal axis thereof, said control rod having a first end positioned adjacent said double valve body and defining an outlet valve seat, substantially concentric with said inlet valve seat said control rod being supported within said housing for reciprocable longitudinal movement between an inflating position wherein said outlet valve seat sealingly engages said double valve body and positions said double valve body out of engagement with said inlet seat to close said outlet valve seat and open said inlet valve seat for delivering compressed air to the vehicle suspension system to raise the vehicle height, and a venting position wherein said outlet valve seat on said control rod is displaced from said double valve body and said double valve body is biased into sealing engagement with said inlet valve seat to close said inlet valve seat and open said outlet valve seat for venting compressed air from the vehicle suspension system to lower the vehicle height, said control rod having a maintenance position corresponding to the predetermined vehicle height; wherein said inlet and said outlet valve seats are in mutual sealing engagement with said double valve body to maintain the vehicle at its predetermined vehicle height.

a guide member supported for longitudinal movement within said housing;

an actuation drive coupled to said guide member and to said vehicle for translating changes in vehicle height to corresponding changes in the longitudinal position of said guide member within said housing;

a control piston in said housing, said control piston being movable with said guide member and being coupled to move said control rod between its inflating, venting, and maintenance positions in response to changes in vehicle height;

means for selectively fixing said control piston in at least two longitudinal positions relative to said guide member for establishing at least two alternate predetermined vehicle heights that are maintained by said leveling valve assembly;

said guide member defining a longitudinally extending interior chamber; and said control piston being longitudinally slidably disposed in said interior chamber of said guide member.

2. A leveling valve assembly as claimed in claim 1 and wherein said control piston is held in place within said interior chamber by a cover mounted in said chamber, said control piston being captured in said chamber by said cover, said means for selectively fixing said control piston comprising a control chamber associated with said control piston and means for selectively delivering compressed air to said control chamber to move said control piston from one of said at least two longitudinal positions to another one of said at least two longitudinal positions within said interior chamber.

3. A leveling valve assembly as claimed in claim 2 and wherein said control chamber is defined between said cover and said control piston such that selective delivery of compressed air to said control chamber moves said control piston away from said cover.

4. A leveling valve assembly as claimed in claim 2 and wherein said control chamber is defined at an end of said control piston opposite said cover such that selective delivery of compressed air to said control chamber moves said control piston toward said cover, and further comprising a spring for yieldably biasing said control piston away from said cover.

5. A leveling valve assembly as claimed in claim 2 and wherein said cover is threadably secured in said interior chamber of said guide member so that the depth of said cover in said interior chamber is threadably adjustable and wherein the stroke of said control piston is varied by adjustment of the depth of said cover.

6. A leveling valve assembly as claimed in claim 1 and further comprising a compressed air conduit coupled at one end to said compressed air storage chamber through said inlet valve seat and a vehicle suspension system bellows coupled to the other end of said conduit, said conduit delivering compressed air to said bellows to raise the vehicle height when said inlet valve seat is opened, a source of compressed air coupled through a supply conduit to said compressed air storage chamber, and a second valve body in said compressed air storage chamber forming a check valve in line with said supply conduit.

7. A leveling valve assembly as claimed in claim 6 and wherein said compressed air conduit is designed to deliver compressed air from said bellows through said outlet valve seat to ambiance when said outlet valve seat is opened to vent said bellows for lowering the vehicle height.

8. A leveling valve assembly as claimed in claim 1 and further comprising an adjustment mechanism operably associated with said control piston for selectively adjusting at least one of said two longitudinal positions of said control piston relative to said guide member.

9. A pneumatic leveling valve assembly usable with a pneumatic suspension system of a motor vehicle to maintain the motor vehicle at a predetermined vehicle height relative to a surface on which the motor vehicle is supported, said leveling valve assembly comprising:

a housing having a longitudinal axis;

a compressed air storage chamber defined in said housing;

an inlet valve seat formed in said housing and being in communication with said compressed air storage chamber;

a spring biased double valve body positioned within said compressed air storage chamber and being yieldably spring biased into sealing engagement with said inlet valve seat;

an elongated and substantially hollow control rod in said housing extending along said longitudinal axis thereof, said control rod having a first end positioned adjacent said double valve body and defining an outlet valve seat substantially concentric with said inlet valve seat, said control rod being supported within said housing for reciprocable longitudinal movement between an inflating position wherein said outlet valve seat sealingly engages said double valve body and positions said double valve body out of engagement with said inlet seat to close said outlet valve seat and open said inlet valve seat for delivering compressed air to the vehicle suspension system to raise the vehicle height. and a venting position wherein said outlet valve seat on said control rod is displaced from said double valve body and said double valve body is biased into sealing engagement with said inlet valve seat to close said inlet valve seat and open said outlet valve seat for venting compressed air from the vehicle suspension system to lower the vehicle height, said control rod having a maintenance position corresponding to the predetermined vehicle height wherein said inlet and said outlet valve seats are in mutual sealing engagement with said double valve body to maintain the vehicle at its predetermined vehicle height;

a guide member supported for longitudinal movement within said housing;

an actuation drive coupled to said guide member and to said vehicle for translating changes in vehicle height to corresponding changes in the longitudinal position of said guide member within said housing;

a control piston in said housing, said control piston being movable with said guide member and being coupled to move said control rod between its inflating, venting, and maintenance positions in response to changes in height;

means for selectively fixing said control piston in at least two longitudinal positions relative to said guide member for establishing at least two alternate predetermined vehicle heights that are maintained by said leveling valve assembly; and a sleeve longitudinally slidably disposed in said housing aligned with and coupled to said guide member, said control piston being disposed in said sleeve and being movable between at least two alternate longitudinal positions relative to said sleeve and thus relative to said guide member.

10. A leveling valve assembly as claimed in claim 9 and wherein said sleeve is threadably coupled to said guide member and further comprising means for rotating said sleeve relative to said guide member to adjust the relative longitudinal positions thereof to set the at least two alternate predetermined vehicle heights.

11. A leveling valve assembly as claimed in claim 10 and wherein said means for rotating said sleeve comprises a cover mounted in said sleeve capturing said control piston in said sleeve, said cover being rotationally fixed relative to said sleeve, and an actuation rod coupled to said cover and extending to a position outside said housing, selective manual rotation of said actuation rod causing corresponding rotation of said cover and said sleeve to adjust the relative longitudinal position of said sleeve relative to said guide member.

12. A leveling valve assembly as claimed in claim 9 and further comprising an adjustment mechanism operably associated with said control piston for selectively adjusting at least one of said two longitudinal positions of said control piston relative to said guide member.

* * * * *